US005163188A

United States Patent [19]

Munroe

[11] Patent Number: 5,163,188

[45] Date of Patent: Nov. 17, 1992

[54] INVALID SEAT APPARATUS

[76] Inventor: Thomas S. Munroe, 310 Barling St., Apt. 405, Exeter, Ontario, Canada, N0M 1S2

[21] Appl. No.: 740,721

[22] Filed: Aug. 6, 1991

[51] Int. Cl.[5] ................ A61C 5/00

[52] U.S. Cl. ................ 5/81.1; 5/86.1; 297/DIG. 4; 297/440; 4/483

[58] Field of Search ................ 5/81.1, 86.1; 4/480, 4/483; 297/5, 6, 440, DIG. 4; 280/250.1, 650

[56] References Cited

U.S. PATENT DOCUMENTS

| | | | |
|---|---|---|---|
| 3,512,187 | 5/1970 | Thomas et al. | 5/480 X |
| 3,654,643 | 4/1972 | Clanan | 5/81.1 |
| 3,993,349 | 11/1976 | Neufeld et al. | 297/6 |
| 4,052,087 | 10/1977 | Gagliardi | 4/483 X |
| 4,385,769 | 5/1983 | Molino | 297/DIG. 4 X |
| 4,575,113 | 3/1986 | Boudreau | 297/DIG. 4 X |
| 4,962,551 | 10/1990 | Bly | 4/483 X |
| 5,058,912 | 10/1991 | Harroun | 297/5 X |

*Primary Examiner*—Michael F. Trettel
*Attorney, Agent, or Firm*—Leon Gilden

[57] ABSTRACT

A seat construction is arranged formed of light-weight posts to define a framework, wherein the framework mounts a commode seat within the framework for ease of access to individuals of limited physical capacity. A walker and wheel chair type structure is provided for use.

4 Claims, 5 Drawing Sheets

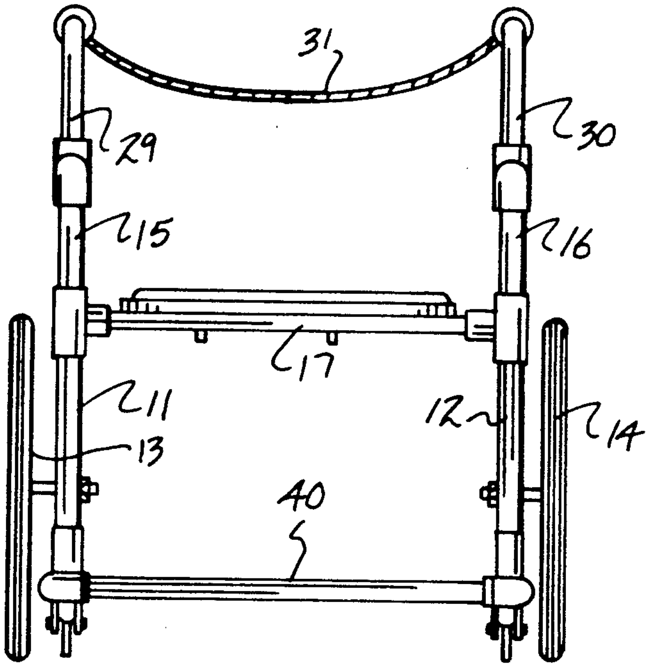
FIG. 4
FIG. 5
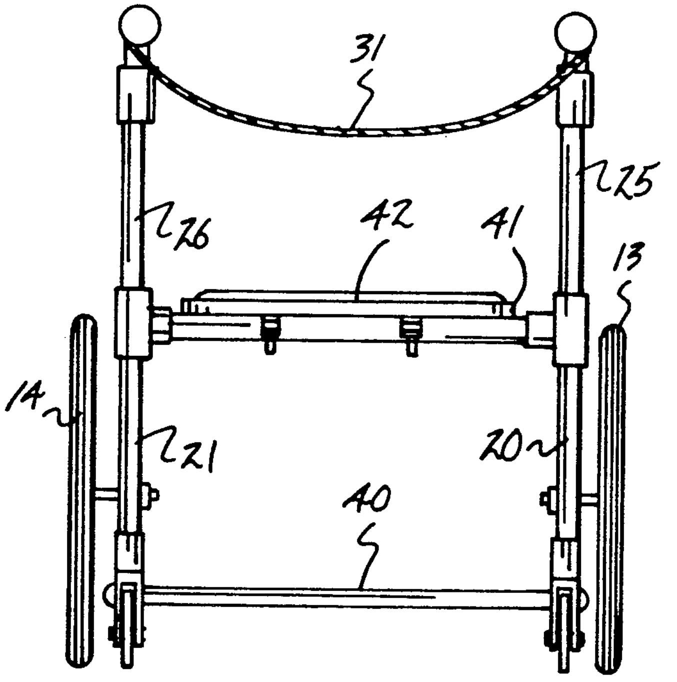

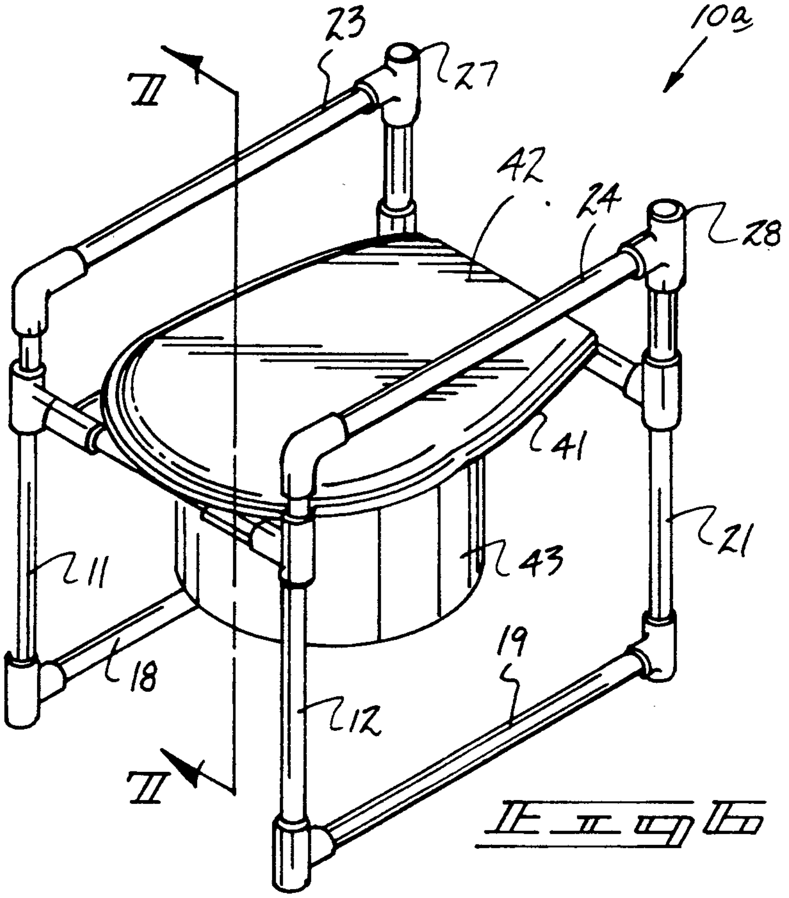
Fig 6
Fig 7
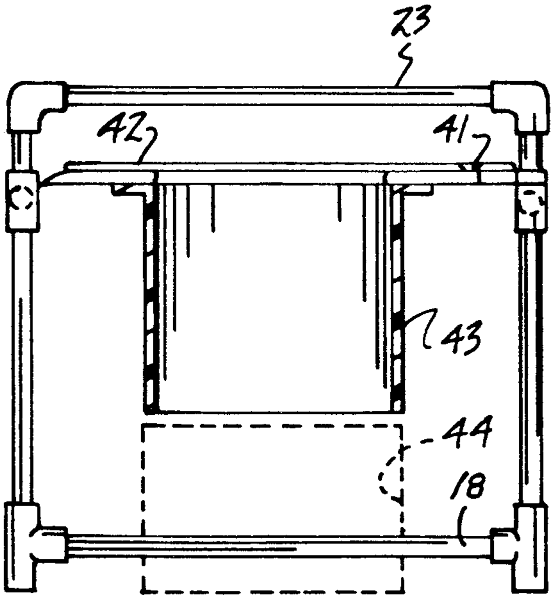

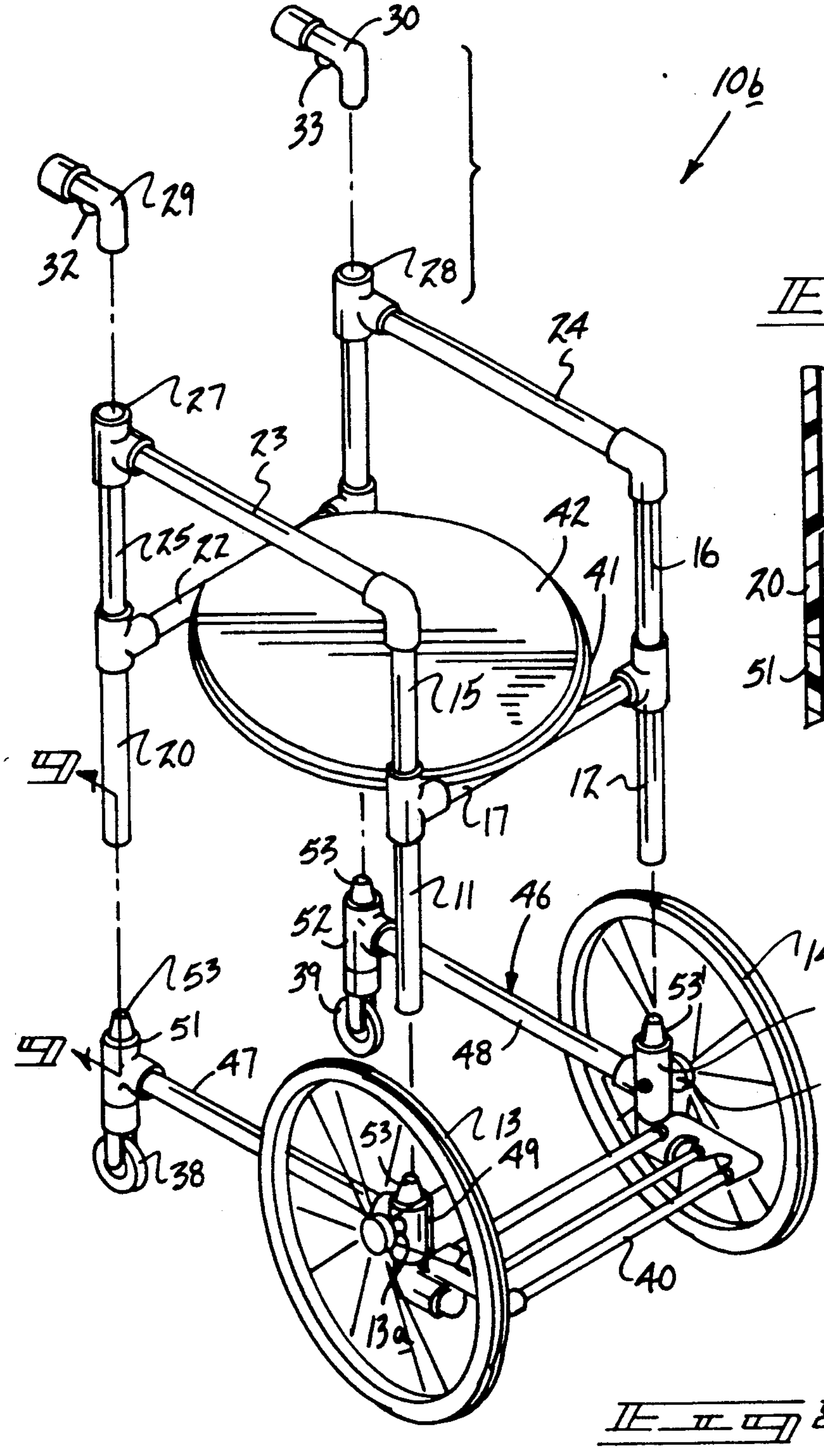
FIG. 8
FIG. 9
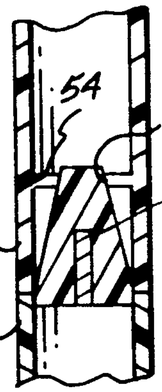

INVALID SEAT APPARATUS

BACKGROUND OF THE INVENTION

1. Field of the Invention

The field of invention relates to wheel chair apparatus, and more particularly pertains to a new and improved invalid seat apparatus wherein the same is arranged for convertibility relative to invalid individuals.

2. Description of the Prior Art

Wheel chair and walker type structure is utilized in the prior art to accommodate individuals of limited or diminished physical capacity permitting those individuals a range of motion and mobility not available under ordinary circumstances. Commode apparatus is utilized in the prior art in association with such structure, but heretofore has failed to provide a convertible organization as set forth by the instant invention with ease of conversion from wheel chair to walker structure.

Examples of prior art include U.S. Pat. No. 4,343,482 to Wegner setting forth a conventional wheel chair structure.

U.S. Pat. No. 4,949,408 to Trkla sets forth a wheel chair structure utilizing a seat for disposal of bodily wastes in a commode arrangement.

U.S. Pat. No. 4,103,969 to Glessner sets forth an adjustable bench type structure defining a generally rectilinear framework organization.

U.S. Pat. No. 4,514,687 to Jensen sets forth a wheel chair displaceable relative to the wheel chair structure to permit overlying of a commode.

U.S. Pat. No. 3,654,643 to Clanan sets forth an invalid lift transfer structure utilizing tubular legs with an auxiliary toilet seat arranged for mounting to the structure.

As such, it may be appreciated that there continues to be a need for a new and improved invalid seat apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of invalid seat apparatus now present in the prior art, the present invention provides an invalid seat apparatus wherein the same is arranged for permitting conversion from a wheel chair to walker type structure for use by individuals of limited or diminished physical capacity. As such, the general purpose of the present invention, which will be described subsequently in greater detail, is to provide a new and improved invalid seat apparatus which has all the advantages of the prior art wheel chair and walker apparatus and none of the disadvantages.

To attain this, the present invention provides a seat construction arrangement formed of light-weight posts to define a framework, wherein the framework mounts a commode seat within the framework for ease of access to individuals of limited physical capacity. A walker and wheel chair type structure is provided for use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved invalid seat apparatus which has all the advantages of the prior art wheel chair and walker apparatus and none of the disadvantages.

It is another object of the present invention to provide a new and improved invalid seat apparatus which may be easily and efficiently manufactured and marketed.

It is a further object of the present invention to provide a new and improved invalid seat apparatus which is of a durable and reliable construction.

An even further object of the present invention is to provide a new and improved invalid seat apparatus which is susceptible of a low cost of manufacture with regard to both materials and labor, and which accordingly is then susceptible of low prices of sale to the consuming public, thereby making such invalid seat apparatus economically available to the buying public.

Still yet another object of the present invention is to provide a new and improved invalid seat apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic frontal view of the instant invention.

FIG. 5 is an orthographic rear view of the instant invention.

FIG. 6 is an isometric illustration of a walker structure utilized by the invention.

FIG. 7 is an orthographic view, taken along the lines 7—7 of FIG. 6 in the direction indicated by the arrows.

FIG. 8 is an isometric illustration of the combined and convertible walker and wheel chair structure utilized by the invention.

FIG. 9 is an orthographic view, taken along the lines 9—9 of FIG. 8 in the direction indicated by the arrows.

DESCRIPTION OF THE PREFERRED EMBODIMENT

Figure 1:
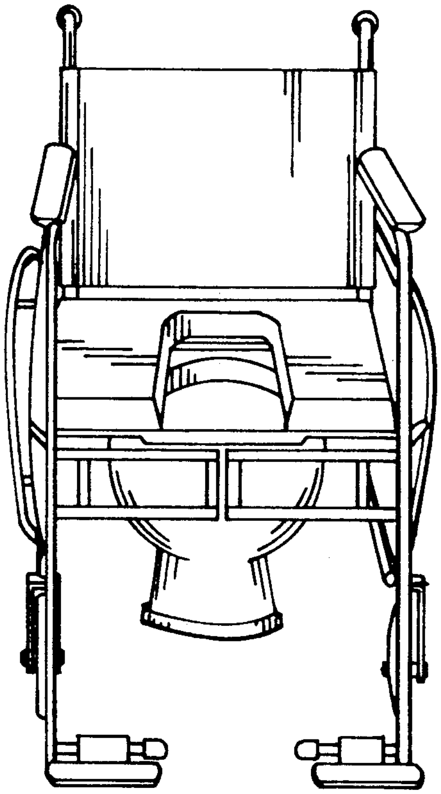
Fig 1 PRIOR ART
FIG. 1 is an isometric illustration of a prior art invalid type commode seat.

With reference now to the drawings, and in particular to FIGS. 1 to 9 thereof, a new and improved invalid seat apparatus embodying the principles and concepts of the present invention and generally designated by the reference numerals 10, 10*b*, and 10*b* will be described.

Figure 2:
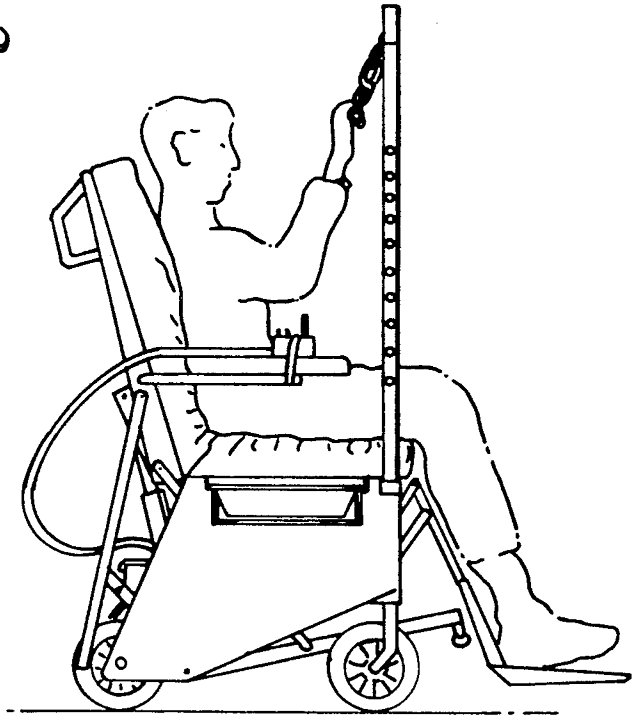
Fig 2 PRIOR ART
FIG. 2 is an orthographic side view of a further prior art seat construction.
Figure 3:
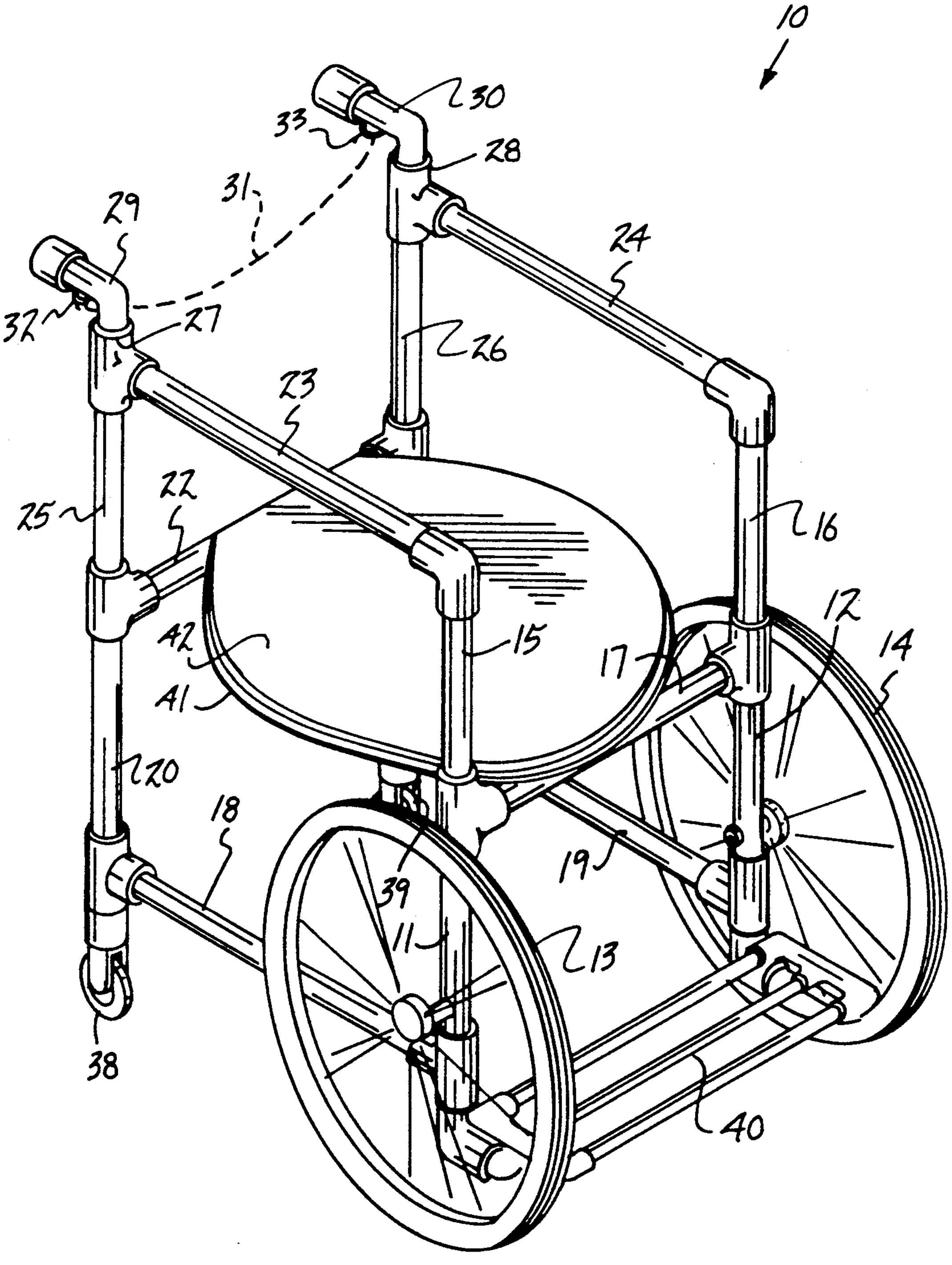
FIG. 3 is an isometric illustration of the instant invention.

The prior art, as typified in FIG. 1, and exemplified in U.S. Pat. No. 4,343,482, sets forth a conventional wheel chair structure, including a toilet member positionable medially of the wheel chair upon removal of an central panel. FIG. 2 illustrates a further prior art structure set forth in U.S. Pat. No. 4,949,408 utilizing a combined commode arrangement mounted within a wheel chair structure.

More specifically, the invalid seat apparatus 10 of the instant invention essentially comprises a lower right front vertical post 11 spaced from, parallel to, and coextensive with a lower left front vertical post 12. Respective right and left front wheels 13 and 14 rotatably mounted about respective right and left axles 13*a* and 14*a* defined by a first diameter are mounted to the respective right and left posts 11 and 12 and defined by a first diameter to extend the wheels below an associated foot rest platform 40 mounted to lower terminal ends of the right and left vertical posts 11 and 12 and extending forwardly thereof. Upper respective right and left front vertical posts 15 and 16 are coaxially aligned relative to the respective posts 11 and 12 extending upwardly thereto. A frontal horizontal mounting post 17 is orthogonally directed between an intersection defined by the lower right vertical post 11 and the upper right vertical post 15, and a junction defined by the lower left front vertical post 12 and the upper left front vertical post 16. Lower right and left respective side horizontal bars 18 and 19 extend orthogonally and rearwardly of the front vertical posts 11 and 12 respectively adjacent their lower terminal ends, with the horizontal bars 18 and 19 arranged parallel relative to one another in a coextensive relationship. These horizontal support bars 18 and 19 orthogonally intersect adjacent lower terminal ends, lower right and left rear vertical posts 20 and 21 respectively. The rear vertical posts 20 and 21 are parallel to and coextensive with the lower right and left front vertical posts 11 and 12. A rear horizontal mounting bar 22 is coextensive with and parallel and aligned in a common plane with the front horizontal mounting bar 17. Directed orthogonally and upwardly relative to the rear horizontal mounting bar 22 and coextensive with a respective lower right and left rear vertical post 20 and 21 are upper right and left rear vertical posts 25 and 26 extending upwardly and coextensively relative to the front right and left vertical posts 15 and 16 respectively and in a parallel relationship relative to one another. Upper right and left side horizontal support bars 23 and 24 extending above and coplanar the respective lower left side horizontal support bars 18 and 19 orthogonally intersect upper terminal ends of the upper right and left front vertical posts 15 and 16 at forward ends of the side bars 23 and 24, wherein the side bars orthogonally intersect upper terminal ends of the upper right and left rear vertical posts 25 and 26. The upper right and left rear vertical posts 25 and 26 include respective right and left handle sockets 27 and 28 to mount respective "L" shaped right and left handles 29 and 30 thereto. The handles include a respective right and left handle loop 32 and 33 to mount a flexible barrier cable 31 therebetween in a removable manner. This cable provides for a back rest for an individual mounted upon the cushioned commode seat 41 and underlying lid 42 that are pivotally mounted at their terminal ends to the rear horizontal mounting bar 22 and span a distance between the rear horizontal mounting bar 22 to the front horizontal mounting bar 17. Respective right and left rear caster wheels 38 and 39 are mounted to lower terminal end portions of the lower right and left vertical posts 20 and 21, with each respective right and left caster wheel mounted rearwardly and in alignment with a respective right and left front wheel 13 and 14, wherein the caster wheel is defined by a second diameter less than the first diameter, but are mounted spatially below the respective right and left axles 13*a* and 14*a* to permit horizontal orientation of the framework, as illustrated.

The walker structure, as set forth in FIGS. 6 and 7, is arranged with the handles 29 and 30 removed therefrom, as well as the underlying platform mounting the wheels 13, 14, 38, and 39. It should be noted that if desired, a conduit 43 may be coaxially aligned with an opening of the cushioned commode seat 41 for directing bodily wastes into an underlying container 44.

The modified construction, as illustrated in FIG. 8, illustrates the embodiment permitting conversion from the wheel chair to the walker structure, wherein it should be noted that the handles 29 and 30 are removably mounted within the respective right and left handle sockets 27 and 28. The respective right and left front vertical posts 11 and 12 and the respective lower right and left rear vertical posts 20 and 21 each include a cylindrical opening for mounting a carriage base 46. The carriage base 46 includes parallel right and left respective carriage rails 47 and 48 that are coextensive relative to one another and mount respective right and left front connector tubes 49 and 50 orthogonally relative to forward ends of the right and left carriage rails 47 and 48. Rear end portions of the right and left carriage rails 47 and 48 mount right and left rear connector tubes 51 and 52 that are in turn parallel to themselves and the front connector tubes 49 and 50. The front connector tubes 49 and 50 rotatably mount the front wheels 13 and 14 about respective axles 13*a* and 14*a* orthogonally directed through the front connector tubes. The foot rest platform 40 defined by parallel bars orthogonally mounted to lower terminal ends of respective right and left front connector tubes 49 and 50. Each connector tube includes a truncated conical resilient connector cone 53 fixedly and coaxially mounted of each connector tube and projecting upwardly therefrom in a coaxial relationship relative to each connector tube. Each connector cone 53 (see FIG. 9) is accordingly arranged to be received within a lower terminal end of a respective vertical post 11, 12, 20, and 21. Each vertical post accordingly includes a connector cone receiving web 54 orthogonally mounted relative to an axis of each vertical post adjacent a lower terminal end thereof. Each web 54 includes a receiving web bore 55 mounted within each web coaxially aligned relative to each vertical post 11, 12, 20, and 21. The web bore 55 accommodates reception of each upper terminal end of each conical connector cone 53 in a resilient configuration of each connector cone 53 and provides for a secure mounting of each connector cone relative to each web 54 within each respective vertical post. In this manner, the upper framework is mounted to the carriage base 46 for use as a wheel chair, with the handles 29 and 30 selectively mounted within the respective right and left handle sockets 27 and 28 for use as a walker or as a free standing commode seat structure, such as illustrated in FIG. 8, with the handles and carriage separated therefrom.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An invalid seat apparatus, comprising, a lower right front vertical post spaced from, parallel to, and coextensive with a lower left front vertical post, and a lower right rear vertical post coextensive with and parallel to a lower left rear vertical post, wherein each vertical post is arranged in a parallel coextensive relationship relative to one another defining a rectangular array, with a frontal horizontal mounting bar orthogonally mounted to the lower right and left respective vertical front posts at respective right and left front vertical post upper terminal ends, and a rear horizontal mounting bar coextensive with and parallel in a coplanar relationship with the frontal horizontal mounting bar, with the rear horizontal mounting bar orthogonally mounted between the lower right and left respective rear vertical posts and respective rear vertical posts right and left upper terminal ends, and a commode seat pivotally mounted to the rear horizontal mounting bar spanning a spacing between the rear horizontal mounting bar and the frontal horizontal mounting bar to overlie the frontal horizontal mounting bar, and a commode seat lid pivotally mounted to the rear horizontal mounting bar to coextensively overlie the commode seat, and a respective upper right and left front vertical post coaxially aligned with the respective lower right and left front vertical posts extending upwardly therefrom, and respective upper right and left rear vertical posts coaxially mounted to the respective lower right and left vertical posts extending upwardly therefrom, and upper right and left side horizontal support bars, wherein the right horizontal support bar is orthogonally mounted between the upper right front vertical post and the upper right rear vertical post, and the upper left side horizontal support bar mounted orthogonally between the upper left front vertical post and the upper left rear vertical post, and a right handle socket mounted coaxially aligned with the upper right rear vertical post at an intersection between the upper right rear vertical post and the upper right side horizontal support bar, and a left handle socket coaxially aligned with the upper left rear vertical post at a further intersection defined between the upper left rear vertical post and the upper left side horizontal support bar, and a right "L" shaped handle selectively and removably mounted within the right handle socket, and a left "L" shaped handle selectively and removably mounted within the left handle socket, and the right "L" shaped handle includes a right handle loop, and the left "L" shaped handle includes a left handle loop, and the flexible barrier cable removably mounted relative to the right and left respective handle loops.

2. An apparatus as set forth in claim 1 wherein the lower right and left respective front vertical posts and the lower right and left respective rear vertical posts are removably mounted relative to an underlying carriage.

3. An apparatus as set forth in claim 2 wherein the carriage includes a right and left carriage rail arranged in a parallel coextensive relationship oriented below and parallel to the respective upper right and left respective side horizontal support bars, and the right carriage rail includes a right front connector tube mounted to a forward end of the right carriage rail, and a right rear carriage tube mounted to a rear end of the right carriage rail, wherein the right front and rear connector tubes are orthogonally oriented relative to the right carriage rail, and the left carriage rail including a left front connector tube mounted to a forward end of the left carriage rail, and a left rear connector tube mounted to a rear end of the left carriage rail, wherein the left front and rear connector tubes are orthogonally oriented relative to the left carriage rail, and the right and left front connector tubes rotatably mount a respective right and left front wheel, wherein each right and left front wheel includes a respective right and left front wheel axle, wherein each respective right and left front wheel axle is orthogonally mounted relative to and medially of the right and left front connector tube, and the right and left rear connector tubes each include a respective right and left caster wheel mounted to the right and left rear connector tubes, and connection means fixedly mounted and projecting above each connector tube for mounting the lower right and left front vertical posts and the lower right and left rear vertical posts to the carriage.

4. An apparatus as set forth in claim 3 wherein the connector means includes a resilient truncated conical connector cone fixedly mounted to and projecting above each connector tube, and each of the lower right and left front vertical posts and the lower right and left rear vertical posts each including a lower post opening, each lower post opening including a connector cone receiving web mounted within each vertical post above the opening, and each receiving web including a receiving web bore, each receiving web bore coaxially aligned within each lower vertical post adjacent to and spaced from each entrance opening for reception of a respective resilient connector cone therewithin when a respective lower vertical post is mounted to the carriage.

* * * * *